US008772702B2

(12) United States Patent
Bachels et al.

(10) Patent No.: US 8,772,702 B2
(45) Date of Patent: Jul. 8, 2014

(54) DETECTOR

(75) Inventors: Thomas Bachels, Benzenschwil (CH); Andreas Erni, Baar Zug (CH); Simon Daniel Fischer, Dietwil (CH); Peter Gruber, Staefa (CH)

(73) Assignee: Siemens AB, Solna (SE)

( * ) Notice: Subject to any disclaimer, the term of this patent is extended or adjusted under 35 U.S.C. 154(b) by 64 days.

(21) Appl. No.: 13/417,618

(22) Filed: Mar. 12, 2012

(65) Prior Publication Data

US 2012/0228477 A1 Sep. 13, 2012

(30) Foreign Application Priority Data

Mar. 10, 2011 (EP) .................................... 11157762

(51) Int. Cl.

*G01J 1/42* (2006.01)
*G01J 5/08* (2006.01)
*G08B 13/19* (2006.01)

(52) U.S. Cl.

USPC ........ 250/221; 250/222.1; 250/239; 250/353; 340/567

(58) Field of Classification Search

USPC ........ 250/216, 221, 222.1, 239, 336.1, 338.1, 250/339.14, 342, 353, DIG. 1; 340/541, 340/565, 567

See application file for complete search history.

(56) References Cited

U.S. PATENT DOCUMENTS 4,242,669 A * 12/1980 Crick ............................ 340/567
4,707,604 A * 11/1987 Guscott ......................... 250/342
4,709,152 A 11/1987 Mueller et al.
4,710,629 A 12/1987 Mueller et al.
4,873,469 A * 10/1989 Young et al. ................. 315/155
4,880,980 A * 11/1989 Muller et al. ................. 250/353
4,939,359 A * 7/1990 Freeman ....................... 250/221
5,089,704 A * 2/1992 Perkins ......................... 250/342
5,243,326 A * 9/1993 Disabato ....................... 340/555
5,923,250 A * 7/1999 Pildner et al. ................ 340/567
5,942,976 A 8/1999 Wieser et al.
6,239,437 B1 * 5/2001 Barone ......................... 250/353
6,262,661 B1 * 7/2001 Mahler et al. ................ 340/567
6,346,705 B1 * 2/2002 Lee et al. ...................... 250/353
6,348,691 B1 * 2/2002 Sandell et al. ................ 250/353
6,377,174 B1 * 4/2002 Siegwart et al. .............. 340/541
6,469,625 B1 * 10/2002 Tomooka ...................... 340/556

(Continued)

FOREIGN PATENT DOCUMENTS

EP 0 189 536 A1 8/1986
EP 0 191 155 A1 8/1986
EP 0 772 171 A1 5/1997

*Primary Examiner* — John Lee

(74) *Attorney, Agent, or Firm* — Laurence A. Greenberg; Werner H. Stemer; Ralph E. Locher

(57) ABSTRACT

A detector contains a housing with at least one window for allowing radiation to enter, at least one outlook sensor for sensing entered radiation, a unit for processing outlook sensor signals, and outlook mirrors that are shaped and mounted in the housing for reflecting onto the outlook sensor radiation from outside detection zones better than radiation from elsewhere. At least some of the outlook mirrors face the window and in operative orientation neighbor each other vertically. The detector further contains one or more window sensors for sensing radiation indicative of the window being masked or having been damaged and a unit for processing window sensor signals. A gap between at least two of the outlook mirrors allows radiation to travel between the window and at least one window sensor or accordant window sender or both.

10 Claims, 5 Drawing Sheets

(56) References Cited

U.S. PATENT DOCUMENTS

| | | | | |
|---|---|---|---|---|
| 6,529,129 | B1 * | 3/2003 | Tomooka | 340/556 |
| 6,559,448 | B1 * | 5/2003 | Muller et al. | 250/342 |
| 7,297,953 | B2 * | 11/2007 | Walters | 250/353 |
| 7,319,228 | B2 * | 1/2008 | Zhevelev et al. | 250/339.02 |
| 7,414,236 | B2 * | 8/2008 | Wipiejewski | 250/221 |
| 7,807,970 | B2 * | 10/2010 | Richard | 250/338.1 |
| 7,875,852 | B2 * | 1/2011 | Zhevelev et al. | 250/332 |
| 7,884,313 | B2 * | 2/2011 | Richard | 250/221 |
| 8,017,913 | B2 * | 9/2011 | Zhevelev et al. | 250/353 |
| 8,368,535 | B2 * | 2/2013 | Pantus | 340/567 |
| 8,451,135 | B2 * | 5/2013 | Carl, Jr. | 340/686.1 |
| 2007/0018106 | A1 * | 1/2007 | Zhevelev et al. | 250/353 |
| 2009/0039296 | A1 * | 2/2009 | Richard | 250/576 |
| 2009/0114800 | A1 * | 5/2009 | Jensen et al. | 250/221 |
| 2009/0146063 | A1 * | 6/2009 | Zhevelev et al. | 250/349 |
| 2012/0098661 | A1 * | 4/2012 | Stromberg et al. | 340/541 |
| 2012/0112073 | A1 * | 5/2012 | Bachels et al. | 250/353 |
| 2012/0228477 | A1 * | 9/2012 | Bachels et al. | 250/208.2 |

* cited by examiner

DETECTOR

CROSS-REFERENCE TO RELATED APPLICATION

This application claims the priority, under 35 U.S.C. §119, of European application EP 11 157 762, filed Mar. 10, 2011; the prior application is herewith incorporated by reference in its entirety.

BACKGROUND OF THE INVENTION

Field of the Invention

The invention concerns a detector that contains a housing with at least one window for allowing radiation to enter, at least one outlook sensor for sensing entered radiation, a unit for processing outlook sensor signals, and outlook mirrors that are shaped and mounted in the housing for reflecting onto the outlook sensor radiation from outside detection zones better than radiation from elsewhere. The radiation from some detection zones is reflected first by primary outlook mirrors and then by secondary outlook mirrors onto the outlook sensor and wherein at least some outlook mirrors face the window and in operative orientation neighbor each other vertically.

Depending to an extent on their application, it is important that such detectors monitor a large area by a high number of detection zones with high and highly uniform sensitivity for each zone, yet be moderate in size, especially for indoor use.

The use of several outlook mirrors allows for creating more detection zones than the number of outlook sensors would otherwise. They can for instance be produced economically by injection-molding substrates and selectively coating several mirrors on every one.

Outlook mirrors are usually shaped as sections of a near-perfect circular paraboloid, or flat in the extreme, thus limiting optical aberration and creating a sharp focal point. To an extent, deviation from a circular paraboloid can be helpful for adjusting focal length, as long as the consequence of optical aberration on yield and frequency shift remains acceptable.

In order to make these detectors compact, outlook mirrors neighbor each other vertically, in operative orientation. These mirrors are close to each other, such that their edges might even touch.

The detector housing can be made more compact by linking outlook mirrors, which means that radiation from a detection zone is first reflected by a primary mirror, then by a secondary mirror and possibly even by further mirrors before it reaches the outlook sensor. Such arrangements are known as folded mirror optics. In this way, the large focal lengths required for distant detection zones can be cut in part. Care must be taken however not to lose much radiation that falls outside the mirror area with each reflection, at the expense of the resulting sensor signal amplitude. A large amplitude is desirable to separate noise and disturbing signals from a desired signal, provided that noise and disturbing signals do not scale with the size of the optics, in particular to assure electromagnetic compatibility and to suppress microphonic effects.

Furthermore, the detector should not just generate large signal amplitudes but be similarly sensitive for radiation from the various detection zones. For several reasons, homogeneous signals are beneficial for the signal analysis by the dedicated detector unit.

In a presence detector or in a heat detector for example, uniform amplitude sensitivity over all zones implies that alerting only depends on the radiation source, not on its position within the detection area. If this were otherwise, an alarm level should be matched to the weakest zone, and immunity to false alarms is reduced in the other zones.

In a motion detector, another kind of detector sensitivity should additionally be sufficiently similar for all detection zones, namely the so-called signal frequency. In this field, a skilled person understands the word frequency to reflect the main frequency component of the outlook sensor signals that arise when an object moves through detection zones. The frequency may be calculated for instance on the basis of the delay between the single positive and negative peaks that arise when the processing unit adds the signal strengths of two reversely polarized pyroelectric sensors that observe a detection zone while a radiating object moves there through. The frequency may even be calculated from a single signal peak by using Fourier-analysis. Depending on detector construction and method of calculation, the frequency is a more or less accurate measure for the velocity of movement. A uniform frequency sensitivity allows for distinguishing known disturbing signals from wanted signals, and the alerting velocity band becomes uniform for all zones.

As a direct consequence of these considerations, a large focal length is required for the far detection zones. In contrast, the near zones should have quite a small focal length. A horizontal outlook mirror row in an operatively oriented detector typically corresponds to a single arc of three-dimensional detection zones at floor level. The sidewise zones thereof are often shortened in their detection range as compared to the central zones, in order to fit the geometry of a square detection area. Consequently, the sidewise zones should have smaller focal length compared to the central zones of the same horizontal mirror row. Using a standard mirror optics, this inevitably causes shadowing effects for the other zones.

In spite of the foregoing, many known motion detectors with mirror optics or Fresnel optics are constructed with a reduced focal length for their far zones in order to reduce the thickness of the detector. As a consequence, everything else remaining equal, the frequency of the signals in the far zones will be smaller than in other zones, resulting in an undesired shift of the alerting velocity band to higher velocities, or a reduction of the immunity against disturbance sources of low frequency, such as air turbulence. Often, a low focal length is compensated by an increased area at the expense of other zones, which causes the motion detectors to be oversensitive for high object velocities.

In published, European patent application EP 0 191 155, corresponding to U.S. Pat. No. 4,709,152, a folded mirror optics of a passive infrared motion detector with primary outlook mirrors and secondary outlook mirrors is described. The incoming radiation of each zone is subject to two reflections by linked mirrors, with exception of the lookdown zone, for which one reflection suffices. Along these optical paths, the radiation is imaged to sensor elements. The primary mirrors are arranged in three horizontal rows for the far zones, the middle zones and the near zones respectively, wherein each mirror corresponds to a detection zone with a different azimuthal direction angle. All primary mirrors have been manufactured on a single piece of material, which contains an opening through which an outlook sensor peeks through. For each row, a single continuous surface of one secondary mirror reflects incoming detection zone radiation from all primary mirrors to the sensor elements. Therefore, the primary mirrors in one row are all linked to one secondary mirror. Two secondary mirrors are plane, the third is concave. The size of each common secondary mirror ensures that most, if not all, radiation from a detection zone that reflects from any single primary mirror is captured by it.

A European patent application with file number 10190290.6, as yet unpublished, addresses a list of issues concerning EP 0 191 155. It proposes to modify the detector in that each outlook mirror in at least one linked pair is shaped and mounted in the housing so as to prevent it from reflecting radiation from another detection zone in sequence with other outlook mirrors onto the outlook sensor. Thus, at least one pair of linked mirrors is dedicated to transporting radiation from a single detection zone to the outlook sensor, without contributing to such transport of radiation from other zones, even if the net result is a reduction of the available mirror area for all concerned detection zones. For detection zones where it matters, the reduction of shadowing effects and the increased freedom in spatially arranging mirrors in the housing turns out to outweigh this loss. More specifically, the patent application proposes to use primary outlook mirrors in horizontal rows for easily projecting detection zones on a curved area at floor level around the detector, and use dedicated mirror pairs only for major variations of the zone distance or of angular distribution. In contrast to previous detectors with the folded mirror optics, this allows for detectors less than 3 centimeters thick that more homogeneously and with improved uniformity of sensitivity cover detection zones from the floor immediately below up to 12 meters away.

None of the above considerations concern a window sensor for spotting whether the window is masked or damaged. That is what so-called anti-masking detectors do. They perform self-assessment.

Depending on their application, detectors may be subjected to sabotage coating or enclosing, scratching, fume deposit, dirt spray or aggressive chemicals, either of which might impede outside radiation from reaching the outlook sensor. In order to monitor the state of the window, anti-masking detectors contain a window sensor and a unit for processing the window sensor signals. Additional to window sensors, this might involve the use of window senders, dedicated sources of radiation.

Depending on window material and sensor type, a suitable window sender might be a visible light or near infrared source, advantageously one or more light emitting diodes ("LED") or infrared ("IR") emitting diodes ("IRED"). For instance, a near infrared source for an anti-masking system allows for the detection of hairspray, a well known substance for blocking the view of a pyrosensor. Thus, for many applications and specifications, a proper heat source is not required. If it is, the energy consumption for locally heating up a masking object also requires having a large back-up battery.

Published, European patent application EP 0 772 171, corresponding to U.S. Pat. No. 5,942,976, describes an infrared motion detector with primary mirror optics and anti-masking monitoring. The detector contains a window sensor for sensing radiation indicative of the window being covered by an object or sprayed substance, a window sender for generating the radiation and a unit for processing the signals thereof. The window sensor and window sender are mounted on a PCB and located in a gap between two outlook mirrors. Radiation travels from the window sender though the gap to the window and in reverse to the window sensor. The gap causes the outlook mirrors to be placed further apart than they should be for optimizing optical performance and compactness. An outlook sensor is placed oppositely, mounted on a second PCB that extends at some angle to the first. The gap is in full view of the outlook sensor, thus obviously compromising yield, reach and compactness of the detector.

Published, European patent EP 0 189 536 A1, corresponding to U.S. Pat. No. 4,710,629, schematically displays an oversized motion detector with folded mirror optics and special anti-masking monitoring, which uses a mid-wavelengths' IR source, a weak heat source, a window sender for piping the radiation outside the detector window and towards the front side of its window. After passing through the window, radiation of this source is imaged to the outlook sensors by a dedicated window mirror. A masking alarm will be triggered if the level of the resulting signals is too low. Thus, the IR sensors act both as outlook sensors and as window sensors. This arrangement obviously saves some component costs and specific production efforts, but obviously the detector is not capable of spotting masking by an object that is further away from the window. For instance, if someone would hang a hat on such a detector, it is unlikely to respond properly. Also, the construction as described cannot be made sufficiently compact and still obtain the required energy yield.

It is important that the addition of a dedicated window sensor, a dedicated window sender or any such dedicated component does not cause shadowing of the outlook sensor or outlook mirrors, or cause the detector to be essentially larger for obtaining the same energy yield and uniformity. Window sensors and window senders are active electronic components. For avoiding electromagnetic interference, the window senders in particular are best mounted at some distance to the sensors, notably to the outlook sensor, as well as to the unit for processing its signals and to the related circuitry. At the same time, efficient production processes must be used for fastening components, in particular surface mount technology ("SMT") and, for instance for some pyrosensors, through-hole technology ("THT") on printed circuit boards ("PCB"). Such a PCB might be present in a convenient location anyway for mounting the outlook sensor or its processing unit. SMT however only allows for mounting a component flat onto the PCB surface, without the option of tilting, thus further limiting the freedom of where to place it.

Depending on the details of the construction, the active surface part of the window may still be partially monitored with the help of stray light, even if there is no intervisibility with the window sensor or window sender, but this effect is difficult to control, and the signal level by comparison is reduced.

SUMMARY OF THE INVENTION

It is accordingly an object of the invention to provide a detector which overcomes the above-mentioned disadvantages of the prior art devices of this general type.

With the foregoing and other objects in view there is provided, in accordance with the invention a detector. The detector contains a housing with at least one window for allowing radiation to enter, at least one outlook sensor for sensing entered radiation, a unit for processing outlook sensor signals, and outlook mirrors shaped and mounted in the housing for reflecting onto the outlook sensor the radiation from outside detection zones better than the radiation from elsewhere. At least some of the outlook mirrors face the window and in operative orientation neighbor each other vertically. The detector further has an accordant window sender, at least one window sensor for sensing the radiation indicative of the window being masked or having been damaged, the unit additionally processing window sensor signals output by said window sensor. A gap between at least two of the outlook mirrors allows the radiation to travel between the window and the at least one window sensor or the accordant window sender or both.

According to the invention, the object is achieved in that the detector contains one or more window sensors for sensing radiation indicative of the window being masked or having been damaged and a unit for processing window sensor signals, a gap between at least two of the outlook mirrors allows radiation to travel between the window and at least one window sensor or accordant window sender or both. Because in general outlook mirrors are closer to the outlook sensor and more upright as they are mounted higher up in the operatively oriented detector, in order to reduce their focal length and zone distance, their edges tend not to touch each other. This leaves some space for a gap in between. From the perspective of the outlook sensor, that space is shaded anyhow by the more closely mounted mirror. Crucially, it turns out that such gaps can be made to extend sufficiently in the vertical direction for allowing a window sensor or window sender behind the outlook mirrors sufficient sight of a substantial part of the window in front at no or negligible optical deterioration, notably without essential loss of energy yield.

In a preferred embodiment of the invention, radiation from some detection zones is reflected first by primary outlook mirrors and then by secondary outlook mirrors onto the outlook sensor.

If located nearby to a window sender, a window sensor can best receive radiation that has been reflected or diffused after absorption by a masking material, while both window sender and window sensor conveniently can be mounted flat on a PCB. As it happens, for a compact detector with the typical amount, distribution and size of detection zones, suitably positioned and suitably large gaps between two neighboring mirrors can be configured.

In a preferred embodiment of the invention, the gap extends between at least some outlook mirrors in two horizontal rows of neighboring outlook mirrors. Preferably, in folded mirror optics, linked outlook mirrors reflect radiation from a detection zone consecutively, each outlook mirror in at least one linked pair is shaped and mounted in the housing so as to prevent it from reflecting radiation from another detection zone in sequence with other mirrors onto the outlook sensor, and at least one outlook mirror in such a linked pair is mounted in one of the horizontal rows. Preferably at least one outlook mirror that is not in such a linked pair is mounted in the same horizontal row. In general, outlook mirrors in two rows are placed and oriented with comparatively large deviation from each other. Within one row, the deviation from one mirror in an exclusively linked pair to the next mirror that is linked non-exclusively also tends to be large. As a side effect, this leaves more distance between the neighboring edges of certain mirrors in two rows, which translates into more vertical extension of the gap in between.

In a further preferred embodiment of the invention, the window sensor or window sender contains a semiconductor diode, in the latter case for instance a light emitting diode or IR emitting diode, which not only bring low costs and long duration into the equation, but also high yield and small size.

In a further preferred embodiment of the invention, the window sensor or window sender is mounted on a printed circuit board that extends behind the gap. The PCB may also accommodate a processing unit and possibly further components, such as the outlook sensor, thus making parts redundant and production more efficient.

Other features which are considered as characteristic for the invention are set forth in the appended claims.

Although the invention is illustrated and described herein as embodied in a detector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
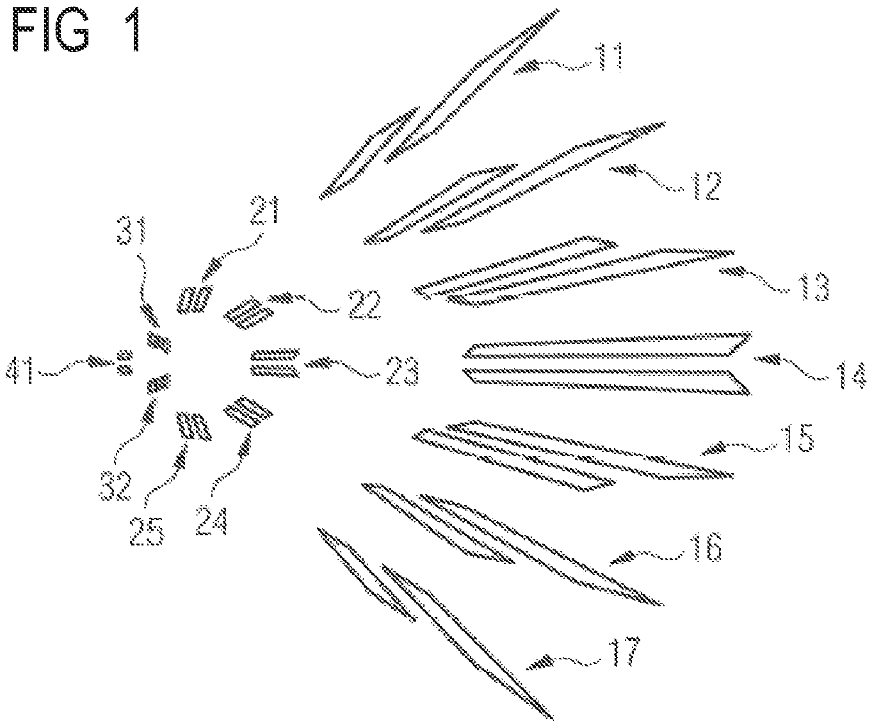
FIG. 1 is an illustration showing a horizontal detection zone pattern of a passive infrared motion detector according to the invention.
Figure 2:
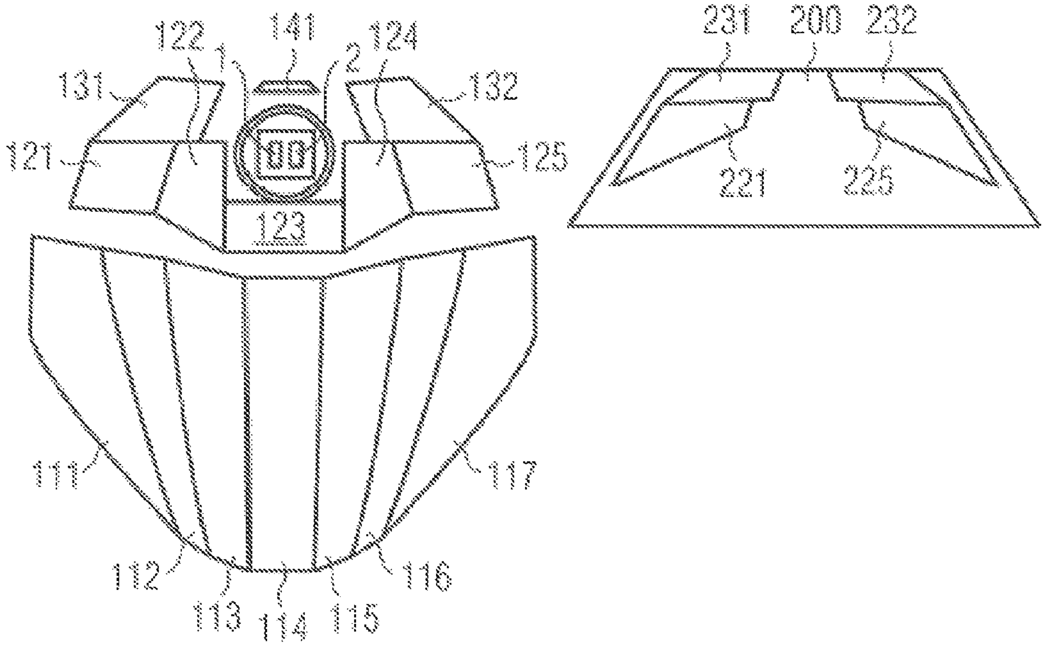
FIG. 2 is a diagrammatic, front view of an outlook sensor and outlook mirrors as they are mounted within a housing of the detector in operative orientation, in which however all secondary mirrors have been reversed by 180° around a vertical axis and moved sidewards so as to expose underlying sensor elements and primary mirrors.

Referring now to the figures of the drawing in detail and first, particularly, to FIGS. 1 and 2 thereof, there is shown two outlook sensor elements of the detector are mapped as two elongated squares in each zone 11, 12, 13, 14, 15, 16, 17, 21, 22, 23, 24, 25, 31, 32, 41 of the detection area. If a person moves through an elongated square, his heat radiation is transported to a sensor element 1, 2.

In FIG. 2, the outlook sensor elements 1, 2 are two pyroelectric sensors. Infrared radiation from most detection zones is reflected first by primary outlook mirrors 111, 112, 113, 114, 115, 116, 117, 121, 122, 123, 124, 125, 131, 132 and then by secondary outlook mirrors 200, 221, 225, 231, 232 onto the sensor elements 1, 2. In this sense, each of these primary mirrors is linked to a secondary mirror.

Figure 3:
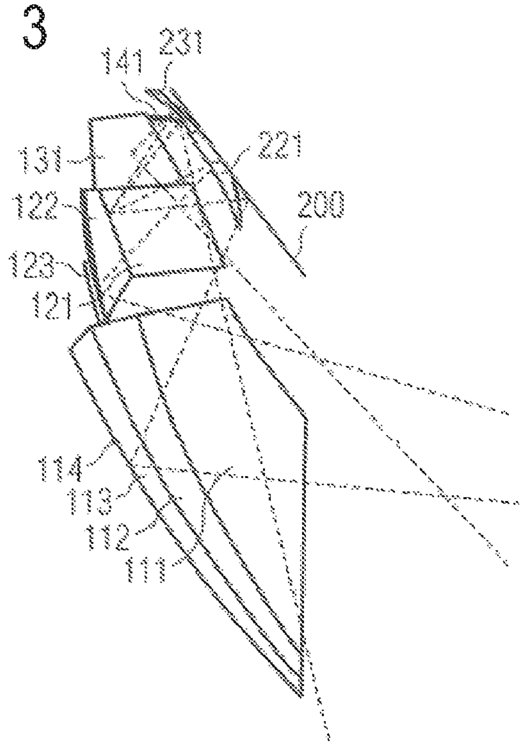
FIG. 3 is a diagrammatic, side view of the mirrors.
Figure 4:
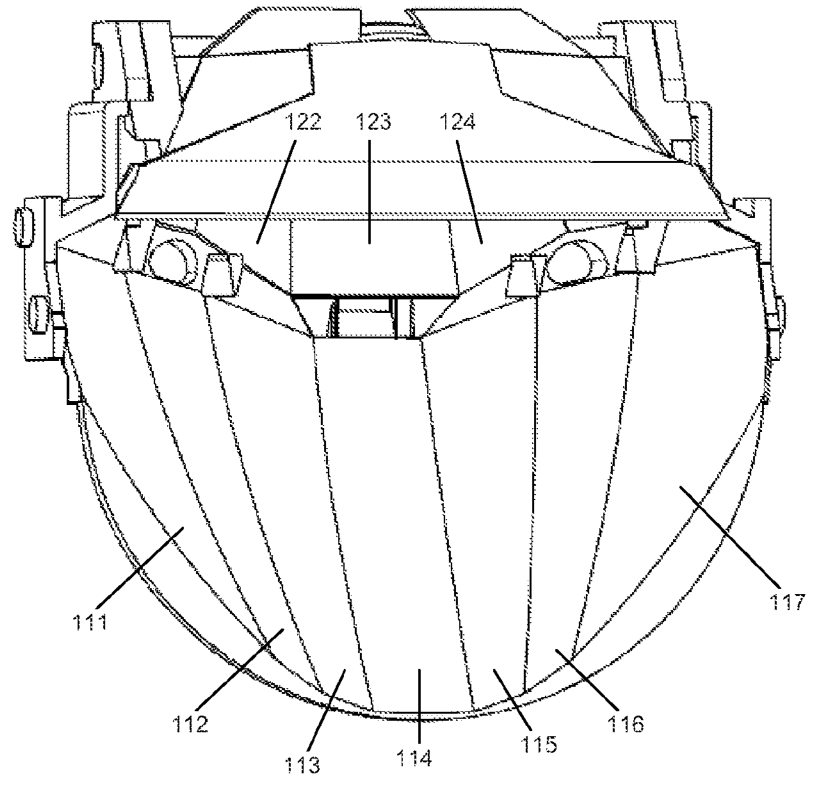
FIG. 4 is a diagrammatic, perspective view of some of the mirrors.

FIG. 3 by use of dotted lines shows how some of the outlook mirrors 114, 123, 131, 141, 200, 231 reflect radiation from four detection zones at various distances. Although not shown, the outlook sensor elements 1, 2 are located where the dotted lines converge.

The nearest, so-called lookdown zone 41 is located almost below the detector. The primary mirror 141, without being linked to any secondary mirror, reflects the radiation there from directly on sensor elements 1, 2.

Beyond the lookdown zone 41, nearby detection zones 31, 32 are monitored by plane primary mirrors 131, 132, which are each linked uniquely to a dedicated concave secondary mirror 231, 232. The short distance between the sensor elements 1, 2 and the concave secondary mirrors 231, 232 allows for the required short focal lengths.

Likewise, the short focal length for the sidewise detection zones 21, 25 is obtained by adjoining concave secondary mirrors 221, 225 on either side of a collective plane secondary mirror 200, which is meant to reflect radiation from the central detection zones 22, 23, 24.

The primary mirror 121 reflects radiation from one of the sideway zones 21 onto the secondary mirror 221, which in turn reflects the radiation onto the sensor elements 1, 2. Both the primary mirror 121 and the secondary mirror 221 are shaped and mounted in a detector housing 4 so as to prevent it from reflecting radiation from another detection zone in sequence with other mirrors onto the sensor elements 1, 2. Likewise, the primary mirror 125 and the secondary mirror 225 are dedicated only to the sideway detection zone 25 at the other end. For one thing, because dedicated mirror pairs 121, 221, respectively 125, 225 are optically isolated from mirrors nearby, the order in which nearby concave and flat mirrors transport radiation to the sensor elements 1, 2 can be reversed. Thus, concave primary mirrors 122, 123, 124 in the middle can reflect radiation from more distant central detection zones 22, 23, 24 onto the common plane secondary mirror 200 and onto the sensor elements 1, 2 with longer focal lengths. Furthermore, the optical isolation of mirrors 121, 125, 221, 225 from all other mirrors provides additional freedom of location, size and orientation, which can be used to minimize shadowing effects, to improve the uniformity of sensitivity and better to place the corresponding detection zones where they are required.

The primary mirror 121, which is uniquely linked to the secondary mirror 221, is lined up horizontally in operative orientation with at least two primary mirrors 122, 123, 124 that are themselves linked to a common secondary mirror 200. The same holds true for primary mirror 125, which is uniquely linked to secondary mirror 225. Similarly, primary mirrors 121, 122, 123, 124, 125 and secondary mirrors 200, 221, 225 each constitute horizontal rows in operative orientation, in which rows the smaller vertical extension of neighboring mirrors overlaps the larger by more than 50%. The row of primary mirrors contains two mirrors 121, 125 that are linked to, and only to, mirrors 221, 225 in the row of secondary mirrors. This mix of dedicated mirror pairs with multiple linked mirrors altogether increases performance.

Radiation from the farthest detection zones 11, 12, 13, 14, 15, 16, 17 is first reflected by the largest concave primary mirrors 111, 112, 113, 114, 115, 116, 117 onto the common flat secondary mirror 200 and then onto the sensors elements 1, 2.

All outlook mirror surfaces constitute sections of a circular paraboloid or of a plane. Alternatively, to an extent, linked primary and secondary mirrors could both be shaped as concave reflectors, which also offer extra freedom. However, care must be taken to avoid high aberration due to the non-paraxial nature of the system, mainly at the expense of sensitivity and uniformity of sensitivity.

Figure 5:
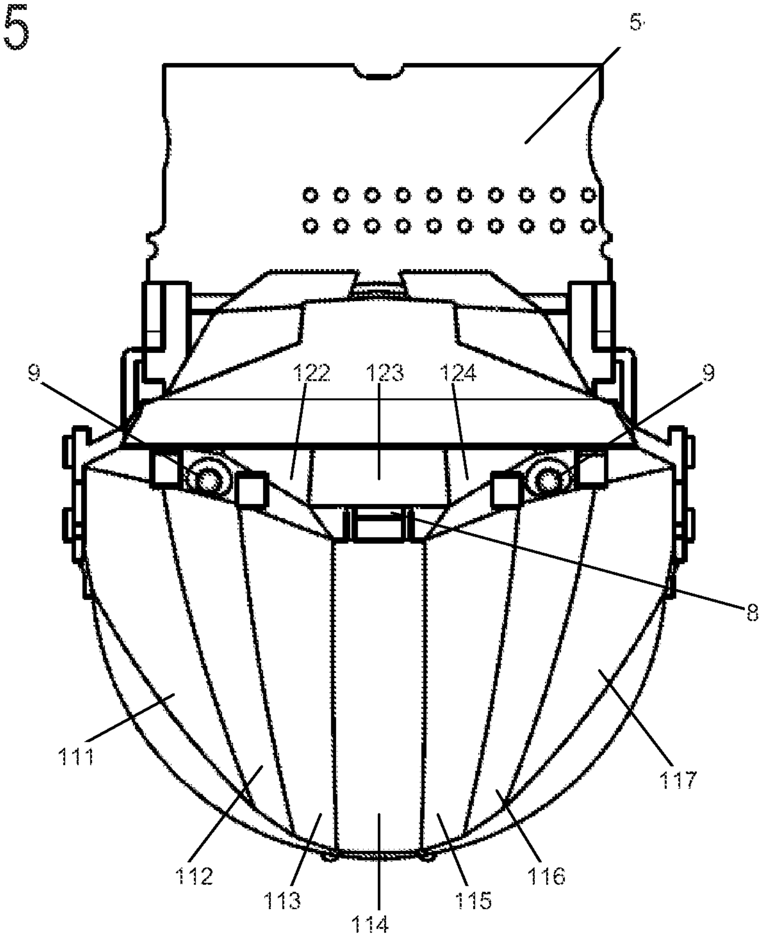
FIG. 5 is a diagrammatic, perspective frontal front view of some of the mirrors and the PCB on which the window sensor and window senders are mounted.
Figure 6:
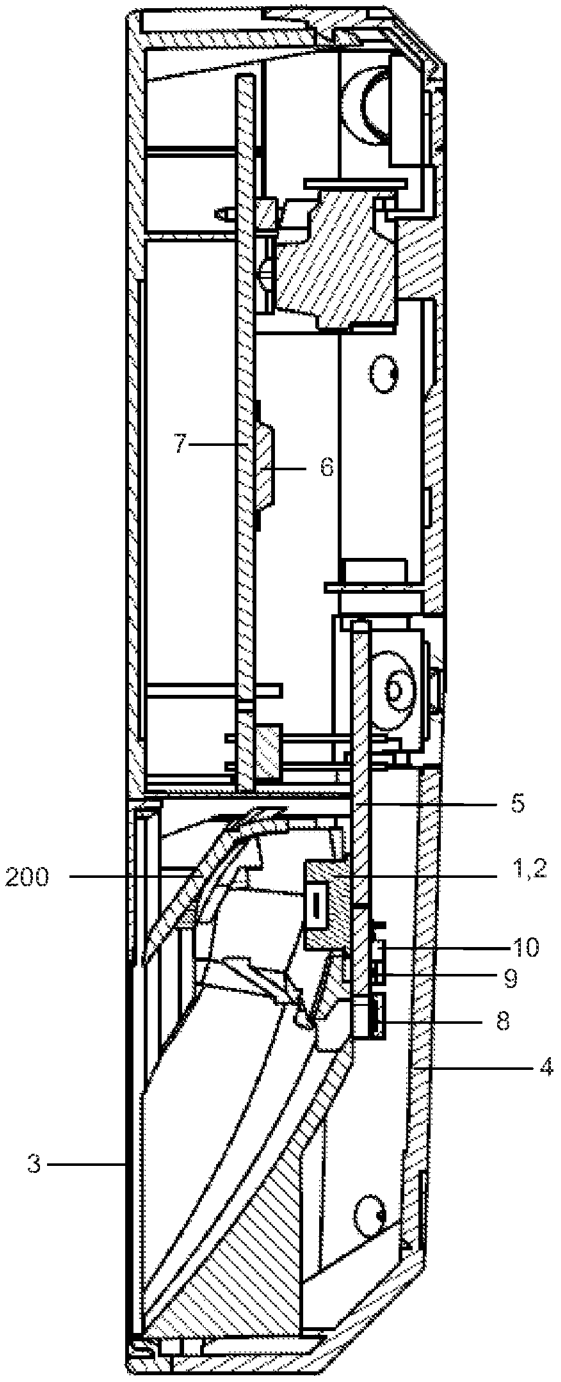
FIG. 6 is a diagrammatic, cross-sectional side view of the detector.
Figure 7:
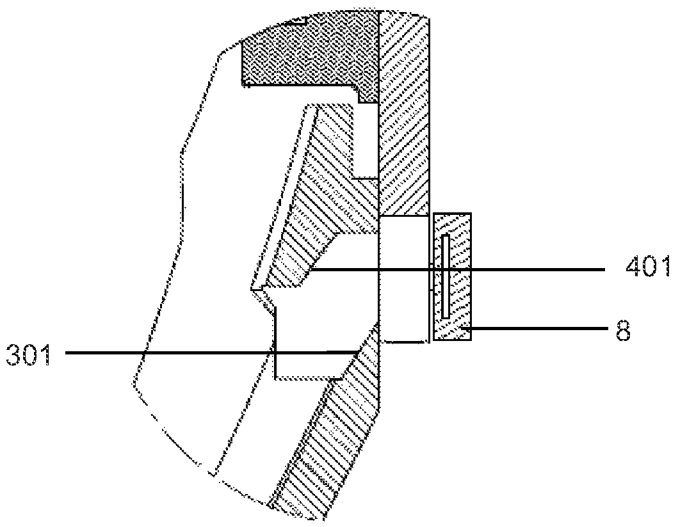
FIG. 7 is a diagrammatic, cross-sectional side view of a part of the detector that includes the window sensor and its window mirrors.

In FIGS. 5, 6 and 7, housing 4 contains window 3 at the front for allowing radiation to enter. The housing 4 is around 3 centimeters thick from front to back. Mirror optics, including secondary outlook mirror 200, are mounted in a lower part of the housing 4. The outlook sensor elements 1, 2 are mounted on the printed circuit board 5. This board also carries the centrally mounted window sensor 8 in the sense of a near-infrared sensor diode, two window senders 9 in the sense of near-infrared LEDs and four indicator light sources 10 in the sense of visible light LEDs. The window sensor 8 has a direct view of the upper half of the window 3. The unit for processing outlook sensor signals includes a semiconductor microprocessor in the sense of a central processing unit mounted on a second printed circuit board 7. The microprocessor doubles as a unit 6 for processing window sensor signals. In the alternative, the unit for example could be an application specific integrated circuit.

Advantageously, the gap also allows radiation from an indicator light source 10 mounted on the PCB 5 to travel to the window 3, thus allowing efficient production of detectors with warning lamps or the like. Within its gap, window mirrors focus this radiation on a hazy part of the window to make it visible over a large area in front of the detector.

In an alternative embodiment, the outlook sensor itself doubles as window sensor. For this, a window sender behind the gap sends out radiation of a kind that noticeably reacts with most or all masking materials and that the outlook sensor is sensitive for. Focusing means in the sense of window mirrors within the gaps deflect the radiation at an angle to the window surface better to suit the higher position of the outlook sensor.

The window sensor 8 and the window senders 9 consist of semiconductor diodes with built-on lenses. In order to maximize use of the gap area by the window sensor 8 and achieve a focal point that lies a few centimeters outside the detector housing 4, additional dedicated window mirrors 301, 401 have been made on the substrate shared with most primary outlook mirrors 111, 112, 113, 114, 115, 116, 117, 121, 122, 123, 124, 125, 131, 132. For such focusing means, it has been found advantageous that the first window mirror 401 counting from the window sensor 8 is a curved mirror, for example a section of an ellipsoid, and that the second window mirror 301 is a plane tilted mirror, which results in a z-shaped optics. In a more extreme embodiment, these mirrors can be made so large that the window sensor no longer has a direct line of sight onto the window.

In an embodiment with an even longer reach that is even more compact, the PCB ends immediately below the outlook sensor, thus making place for larger outlook mirrors below, and carries the large electronic components higher up at its front side, thus allowing the rear wall of housing to move closer. In this embodiment, the window sensor and window senders are mounted higher up at the rear side of the PCB, and are connected to their respective gaps below by light conductors, in particular fiber optic cables.

In yet a further embodiment, light guides extend through and beyond the gaps towards the window, at the expense of energy yield and uniformity but achieving superior anti-masking functionality.

As a result of such projective measures, if reflective objects in the vicinity of or on window 3 mask the view of the detector, a relatively high intensity of radiation from the window senders 9 will be reflected onto the window sensor 8.

After installation of the detector, it is commissioned by letting it register the window sensor signal level during a non-masked, normal operation in its new surroundings. As part of a pre-programmed anti-masking algorithm, a threshold difference value already has been included during production in the factory.

The invention claimed is:

1. A detector, comprising:

a housing with at least one window for allowing radiation to enter;

at least one outlook sensor for sensing the radiation entering via said window;

a unit for processing outlook sensor signals;

outlook mirrors shaped and mounted in said housing for reflecting onto said outlook sensor the radiation entering via said window from outside detection zones better than the radiation entering via said window from elsewhere, at least some of said outlook mirrors face said window and in operative orientation neighbor each other vertically;

a window sender;

at least one window sensor for sensing radiation indicative of said window being masked or having been damaged, said unit additionally processing window sensor signals output by said window sensor;

a gap between at least two of said outlook mirrors allowing the radiation indicative of said window being masked or having been damaged to travel between said window and said at least one window sensor or said window sender or both; and from a perspective of said outlook sensor, some space of said gap being shaded by an outlook mirror being more closely mounted to said outlook sensor of said at least two outlook mirrors defining said gap, such that said gap extending in a vertical direction for allowing said window sensor or said window sender behind said outlook mirrors sufficient sight of a majority part of said window in front at no or negligible optical deterioration namely without essential loss of energy yield.

2. The detector according to claim 1, wherein said outlook mirrors include primary outlook mirrors and secondary outlook mirrors, the radiation from some of the outside detection zones is reflected first by said primary outlook mirrors and then by said secondary outlook mirrors onto said outlook sensor.

3. The detector according to claim 1, wherein said gap extends between at least some of said outlook mirrors in two horizontal rows of neighboring ones of said outlook mirrors.

4. The detector according to claim 3, wherein:

linked ones of said outlook mirrors reflect the radiation from a detection zone consecutively;

each of said outlook mirrors in at least one linked pair of said outlook mirrors is shaped and mounted in said housing so as to prevent said linked pair from reflecting the radiation from another detection zone in sequence with other said outlook mirrors onto said outlook sensor; and at least one of said outlook mirrors in said linked pair is mounted in one of said horizontal rows.

5. The detector according to claim 1, further comprising focusing means, said window sender and said focusing means for focusing radiation there from on said window or outside the detector.

6. The detector according to claim 1, further comprising focusing means for focusing radiation from said window or from outside the detector onto said window sensor.

7. The detector according to claim 5, further comprising a substrate, at least some of said outlook mirrors, which face said window and in operative orientation neighbor each other vertically, is made on a substrate; and wherein said focusing means has at least one window mirror that has been made on said substrate.

8. The detector according to claim 1, wherein one of said window sensor or said window sender contains a semiconductor diode.

9. The detector according to claim 1, further comprising a printed circuit board, one of said window sensor or said window sender is mounted on said printed circuit board that extends behind said gap.

10. The detector according to claim 1, wherein said unit for processing outlook sensor signals is suitable for generating an output representative of a movement of an object through the outside detection zones.

* * * * *